(No Model.)

G. WELLHOUSE.
Blower for Open Stoves and Grates.

No. 236,199. Patented Jan. 4, 1881.

Witnesses:
E. M. Stead
Dayton A. Doyle

Inventor:
George Wellhouse,
by C. P. Humphry
Atty.

UNITED STATES PATENT OFFICE.

GEORGE WELLHOUSE, OF AKRON, OHIO.

BLOWER FOR OPEN STOVES AND GRATES.

SPECIFICATION forming part of Letters Patent No. 236,199, dated January 4, 1881.

Application filed November 22, 1880. (No model.)

*To all whom it may concern:*

Be it known that I, GEORGE WELLHOUSE, of Akron, in the county of Summit and State of Ohio, have invented a new and useful Improvement in Blowers for Open Stoves and Grates, of which the following is a specification.

The object of my invention is to provide a blower for open stoves and grates which may be readily shifted so as to become a damper, and remain in either position without hooks or catches of any kind.

It consists in supporting the blower by arms or links attached to the stove-front, so arranged that the blower may be swung upward to close the stove above the grate, or downward to close the stove in front of the grate; and it also consists in so arranging the parts that the blower may be held in either position by gravitation.

Figure 1:
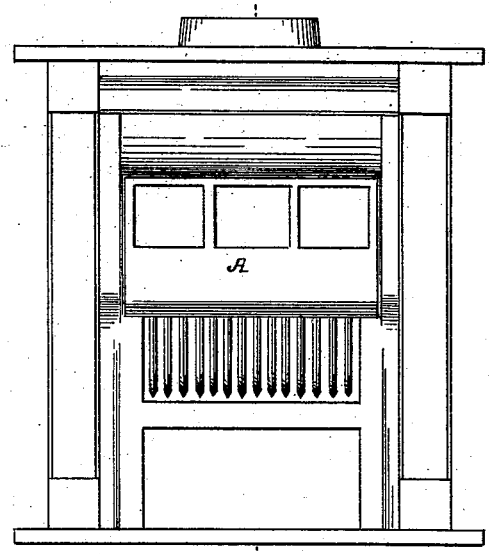
Figure 2:
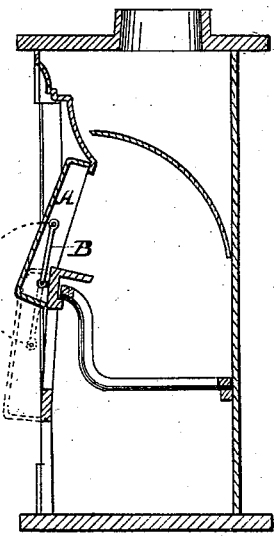

In the accompanying drawings, Figure 1 represents an open stove provided with my improved blower, the latter resting above the grate; and Fig. 2, a vertical cross-section of Fig. 1 at the line $x\ x$.

The blower A, with or without mica windows, is constructed to close the stove-front either above or in front of the grate or fire-basket. Two or more arms or links, B B, hinged to the stove-front near the top of the grate and to the inside of the blower near the central horizontal line thereof, connect the blower and stove, and permit the former to be swung to either its upper or lower position. The links are so hinged that when the blower is swung to the upper position, as indicated in Fig. 2, the upper end of the link will be nearer to the stove than the lower end, or will be swung past the center, and when the blower is swung below to operate as a damper, as indicated by dotted lines in Fig. 2, the lower end of the link will be farther from the stove than the upper. By this arrangement the blower rests against and closes at will either aperture, being supported by the arms alone, without any shoulder or other rest, and when in either position is held in place against the stove or grate front by the force of gravitation alone, no catch or latch being required.

I do not confine my invention to the exact construction shown in the drawings; but

What I claim is—

1. A blower for an open grate or stove, adapted to close either the space above or the space in front of the fire-basket, connected with the stove or grate front by a hinged arm or arms, arranged to be swung vertically to and supported in either position by said arms, substantially as shown.

2. A blower for an open grate or stove, adapted to close either the space above or the space in front of the fire-basket, connected with the stove or grate front by one or more links, arranged to be swung vertically to and supported in either position by said links, and be held in either position by gravitation, substantially as shown.

In testimony that I claim the foregoing I have hereunto set my hand this 11th day of November, A. D. 1880.

GEORGE WELLHOUSE.

Witnesses:
C. P. HUMPHREY,
E. W. STUART.